(12) United States Patent
Jorapurkar et al.

(10) Patent No.: US 9,697,093 B2
(45) Date of Patent: Jul. 4, 2017

(54) TECHNIQUES FOR RECOVERING A VIRTUAL MACHINE

(75) Inventors: Girish Sureshrao Jorapurkar, Woodbury, MN (US); Gaurav Makin, Roseville, MN (US); Sinh Dang Nguyen, Eden Prairie, MN (US)

(73) Assignee: Veritas Technologies LLC, Mountain View, CA (US)

( * ) Notice: Subject to any disclaimer, the term of this patent is extended or adjusted under 35 U.S.C. 154(b) by 765 days.

(21) Appl. No.: 13/604,344

(22) Filed: Sep. 5, 2012

(65) Prior Publication Data
US 2014/0067763 A1 Mar. 6, 2014

(51) Int. Cl.
G06F 7/00 (2006.01)
G06F 17/00 (2006.01)
G06F 11/14 (2006.01)

(52) U.S. Cl.
CPC ...... *G06F 11/1484* (2013.01); *G06F 11/1438* (2013.01); *G06F 11/1469* (2013.01); *G06F 11/1471* (2013.01); *G06F 2201/84* (2013.01)

(58) Field of Classification Search
CPC .............. G06F 11/1469; G06F 11/1471; G06F 11/1438
USPC .......................... 707/639, 610, 674, E17.007
See application file for complete search history.

(56) References Cited

U.S. PATENT DOCUMENTS

| | | |
|---|---|---|
| 6,912,631 B1 | 6/2005 | Kekre et al. |
| 6,931,558 B1 | 8/2005 | Jeffe et al. |
| 7,024,527 B1 | 4/2006 | Ohr |
| 7,093,086 B1 | 8/2006 | van Rietschote |
| 7,194,487 B1 | 3/2007 | Kekre et al. |
| 7,293,146 B1 | 11/2007 | Kekre et al. |
| 7,356,679 B1 | 4/2008 | Le et al. |
| 7,480,822 B1 | 1/2009 | Arbon et al. |
| 7,552,358 B1 | 6/2009 | Asgar-Deen et al. |
| 7,631,020 B1 | 12/2009 | Wei et al. |
| 7,669,020 B1 | 2/2010 | Shah et al. |
| 7,721,138 B1 | 5/2010 | Lyadvinsky et al. |
| 7,797,281 B1 | 9/2010 | Greene et al. |
| 7,805,631 B2 | 9/2010 | Fries |
| 7,809,693 B2 | 10/2010 | Lango et al. |
| 7,827,150 B1 | 11/2010 | Wu et al. |
| 7,831,550 B1 | 11/2010 | Pande et al. |
| 7,831,861 B1 | 11/2010 | Greene et al. |
| 7,937,545 B1 | 5/2011 | Wu et al. |
| 7,937,547 B2 | 5/2011 | Liu et al. |
| 8,019,732 B2 | 9/2011 | Paterson-Jones et al. |

(Continued)

FOREIGN PATENT DOCUMENTS

EP  2234018 A1  9/2010

OTHER PUBLICATIONS

Simpson, Dave, "PHD Virtual Improves VM Backups"; Infostor, Jun. 1, 2009, vol. 13, No. 6, 2 pages.

(Continued)

*Primary Examiner* — Md. I Uddin
(74) *Attorney, Agent, or Firm* — Wilmer Cutler Pickering Hale and Dorr LLP (57) ABSTRACT

Techniques for recovering a virtual machine are disclosed. In one particular embodiment, the techniques may be realized as a method for recovering a virtual machine comprising the steps of selecting a first backup copy of a virtual machine in a first data store, selecting a second data store; enabling use of the virtual machine by reading from the first data store and writing to the second data store, selecting a second backup copy of the virtual machine, and migrating the virtual machine from the second backup copy to the second data store.

20 Claims, 4 Drawing Sheets

(56) References Cited

U.S. PATENT DOCUMENTS

| | | | |
|---|---|---|---|
| 8,046,550 | B2 | 10/2011 | Feathergill |
| 8,060,476 | B1 | 11/2011 | Afonso et al. |
| 8,099,391 | B1 | 1/2012 | Monckton |
| 8,117,168 | B1 | 2/2012 | Stringham |
| 8,135,748 | B2 | 3/2012 | Rosikiewicz et al. |
| 8,140,906 | B1 | 3/2012 | Searls et al. |
| 8,161,321 | B2 | 4/2012 | Zheng et al. |
| 8,185,505 | B1 | 5/2012 | Blitzer et al. |
| 8,209,290 | B1 | 6/2012 | Dowers, II et al. |
| 8,209,680 | B1 | 6/2012 | Le et al. |
| 8,219,769 | B1 | 7/2012 | Wilk |
| 8,230,187 | B1 | 7/2012 | Krinke, II et al. |
| 8,239,646 | B2 | 8/2012 | Colbert et al. |
| 8,290,912 | B1 | 10/2012 | Searls et al. |
| 8,307,177 | B2 | 11/2012 | Prahlad et al. |
| 8,315,983 | B1 | 11/2012 | Sumant et al. |
| 8,315,986 | B1 | 11/2012 | Kapoor et al. |
| 8,332,689 | B2 | 12/2012 | Timashev et al. |
| 8,346,726 | B2 | 1/2013 | Liu et al. |
| 8,346,727 | B1* | 1/2013 | Chester et al. ............... 707/640 |
| 8,346,891 | B2 | 1/2013 | Safari et al. |
| 8,355,407 | B2 | 1/2013 | Wookey et al. |
| 8,386,733 | B1 | 2/2013 | Tsaur et al. |
| 8,402,309 | B2 | 3/2013 | Timashev et al. |
| 8,438,349 | B2 | 5/2013 | Olson et al. |
| 8,443,166 | B2 | 5/2013 | Czezatke et al. |
| 8,464,254 | B1 | 6/2013 | Vohra et al. |
| 8,473,463 | B1 | 6/2013 | Wilk |
| 8,489,552 | B1 | 7/2013 | Dowers, II et al. |
| 8,489,830 | B2 | 7/2013 | Wu et al. |
| 8,510,271 | B1 | 8/2013 | Tsaur et al. |
| 8,527,990 | B1 | 9/2013 | Marathe et al. |
| 8,555,009 | B1 | 10/2013 | Majahan et al. |
| 8,565,545 | B1 | 10/2013 | Syed et al. |
| 8,566,640 | B2 | 10/2013 | Timashev et al. |
| 2007/0043860 | A1 | 2/2007 | Pabari |
| 2008/0162590 | A1* | 7/2008 | Kundu ................ G06F 11/1471 |
| 2008/0243953 | A1 | 10/2008 | Wu et al. |
| 2009/0249284 | A1 | 10/2009 | Antosz et al. |
| 2009/0313447 | A1 | 12/2009 | Nguyen et al. |
| 2010/0011178 | A1* | 1/2010 | Feathergill .......... G06F 11/1466 711/162 |
| 2010/0058106 | A1 | 3/2010 | Srinivasan et al. |
| 2010/0077137 | A1 | 3/2010 | Soemo et al. |
| 2010/0107158 | A1 | 4/2010 | Chen et al. |
| 2010/0115332 | A1* | 5/2010 | Zheng ................ G06F 11/1461 714/6.2 |
| 2010/0169592 | A1 | 7/2010 | Atluri et al. |
| 2010/0262586 | A1 | 10/2010 | Rosikiewicz et al. |
| 2010/0268568 | A1 | 10/2010 | Ochs et al. |
| 2011/0119462 | A1* | 5/2011 | Leach et al. .................. 711/166 |
| 2011/0173405 | A1 | 7/2011 | Grabarnik et al. |
| 2011/0276539 | A1 | 11/2011 | Thiam |
| 2012/0109897 | A1* | 5/2012 | Janakiraman et al. ....... 707/660 |
| 2012/0151273 | A1* | 6/2012 | Ben Or et al. .................. 714/41 |

OTHER PUBLICATIONS

PR Newswire "Arkeia Delivers New vStorage-based Backup Agent for VMWare", Jun. 30, 2010, 3 pages.
M2 PressWIRE "CA Inc: CA Delivers Comprehensive Recovery Management to Support Data Storage, Backup and Recovery; New Releases of CA ARCserve Backupa nd CA XOsoft Leverage Virtualization, Data Deduplication, Storage Resource Management and DR Testing to Support Lean IT", Apr. 27, 2009, 5 pages.
Komiega, Kevin, "Symantec to Expand Deduplication", Infostor, Aug. 1, 2009, vol. 13, No. 8, 2 pages.
Symantec "Customer FAQ—Symantec Backup Exec 12.5 for Windows Servers and Symantec Backup Exec System Recovery 8.5", Aug. 2008, 12 pages.
Fegreus, Jack, "Analysis: Minimizing System Risk via End-to-End Backup and Recovery Process Automation", openBench Labs, Sep. 10, 2009, 24 pages.
Davies, Alex, "NetBackup Disk Based Data Protection Options" White Paper: Technical, Oct. 2007, 26 pages.
Hewlett-Packard "Complete Data Protection for VMWare Virtual Environments", ESG Research Report, ESG IT Infracstructure and Service Management Survey, Mar. 2008, 32 pages.
Symantec "Symantec NetBackup for VMWare Administrator's Guide, Unix, Windows, and Linux, Release 7.0.1", 2010, 118 pages.
Symantec "Symantec NetBackup Administrator's Guide, vol. 1, Unix and Linux, Release 7.0.1", 2010, vol. 1, 911 pages.
VMWare, Inc., "File Level Restore, VMware Data Recovery 1.0", 2009, 3 pages.
VMWare, Inc., "Administration Guide, Site Recovery Manager 1.0 Update 1", 2008, 96 pages.
VMWare, Inc., "vSphere Web Services SDK Programming Guide, vSphere Web Services SDK 4.0", 2009, 182 pages.
VMWare, Inc., "vSphere Basic System Administration, vCenter Server 4.0, ESX 4.0, ESXi 4.0", Copyright 2009-2011, 364 pages.
VMWare "Optimized Backup and Recovery for VMware Infrastructure with EMC Avamar", White Paper, Copyright 2007, 11 pages.
Symantec "Symantec NetBackup PureDisk Getting Started Guide, Windows, Linus, and UNIX Release 6.6, Publication Release 6.6, revision 2", Copyright 2009, 111 pages.
Justin Paul,"Veeam vPower Instant Recovery," Justin's ITBlog, Mar. 24, 2011, 4 pages http://ipaul.me/?p=1425.
Gaurav Makin and Sinh Nguyen, "Method to Reduce the RTO of an Application by Running the Application Directly from its Backup Image in a Virtualization Environment," Symantec, Apr. 27, 2012 (5 pages), http://ip.com/IPCOM/000217035.
"Veeam Backup & Replication: What's New in v6," Veeam (Nov. 18, 2011), 7 pages <http://www.vmc-company.ru/pdf/veeam/veeam_backup_6_0_whats_new.pdf>.
"Veeam Backup & Replication 5.0: User Guide," Veeam (Oct. 2010) 170 pages http://www.veeam.com/files/guide/veeam_backup_5_0_user_guide.pdf.
Henk Arts, "Veeam Backup and Replication v5," Veeam (Nov. 1, 2010), [Video] http://www.slideshare.net/henkarts/veeam-backup-and-replication-v5 , transcript attached 6 pages.
Anton Gostev, "Migration (VMware: [FAQ] Frequently Asked Questions)," Veeam Community Forums (Nov. 2011), 14 pages. http://forums.veeam.com/viewtopic.php?f=24&t=9329#p39955.
Doug Hazelman, "vPower Demo: Instant VM Recovery, U-AIR, Instant File-Level Restore," (Jan. 28, 2011), [Video] http://www.youtube.com/watch?v=zbZMsk2Prgw, Transcript 2 pages.
Veeam Backup & Replication v5 Preview—SureBackup, U-AIR and Instant VM Recovery (Aug. 15, 2010) 19 pages http://www.veeam.com/blog/veeam-backup-replication-v5-preview-surebackup-u-air-and-instant-vm-recovery.html.
Akolkar, Atul et al.; Systems and Methods for Enhancing Virtual Machine Backup Image Data; U.S. Appl. No. 12/950,972, filed Nov. 19, 2010; 45 pages.
Banerjee, Deb; Systems and Methods for Workload Security in Virtual Data Centers; U.S. Appl. No. 13/291,716, filed Nov. 8, 2011; 54 pages.
Rajaa, Subash et al.; Systems and Methods for Facilitating Substantially Continuous Availability of Multi-Tier Applications Within Computer Clusters; U.S. Appl. No. 13/524,367, filed Jun. 15, 2012; 62 pages.
Rajaa, Subash et al.; Systems and Methods for Managing Multipathing Configurations for Virtual Machines; U.S. Appl. No. 13/548,195, filed Jul. 12, 2012; 52 pages.
"Symantec Declares Deduplication Everywhere" Press Release, Symantec.com, Jul. 7, 2009, 5 pages.
Symantec "How to configure and use Exchange Granular Restore in NetBackup 6.5.3 and Later." Article ID: TECH66342 | Created: Jan. 29, 2008 | Updated: Jan. 12, 2010, 5 pages.
International Search Report and Written Opinion mailed on Mar. 19, 2014 for co-pending International Application No. PCT/US2013/056789; 12 pages.

* cited by examiner

TECHNIQUES FOR RECOVERING A VIRTUAL MACHINE

FIELD OF THE DISCLOSURE

The present disclosure relates generally to virtual machines and, more particularly, to techniques for recovering a virtual machine.

BACKGROUND OF THE DISCLOSURE

A virtual machine (VM), such as VMware ESX or Microsoft Hyper-V Server, enables business processes through virtualized systems. Virtual machines may be backed up, copied, or migrated among different data stores and host computers. In the event of a disruption, conventional systems restore a virtual machine from a backup copy.

The Recovery Time Objective (RTO) of an application is determined by the time taken to restore a business process to full functionality after a disaster or other disruption. RTO is sometimes determined by the time it takes to restore the relevant data from a backup copy, which can take several hours or longer depending on the amount of data to be restored.

Some conventional systems attempt to reduce RTO by running the virtual machine directly from its backup copy while simultaneously restoring data from the backup copy to the production server. However, these conventional systems suffer from performance degradation because the backup copy must be shared between both the restoration process and the virtual machine execution process. Additionally, further performance degradation to either process will result depending on whether the backup data store is optimized fast serial memory access beneficial to the restoration process or to fast random memory access beneficial to the execution process.

In view of the foregoing, it may be understood that there may be significant problems and shortcomings associated with traditional virtual machine recovery technologies.

SUMMARY OF THE DISCLOSURE

Techniques for recovering a virtual machine are disclosed. In one particular embodiment, the techniques may be realized as a method for recovering a virtual machine comprising the steps of selecting a first backup copy of a virtual machine in a first data store, selecting a second data store; enabling use of the virtual machine by reading from the first data store and writing to the second data store, selecting a second backup copy of the virtual machine, and migrating the virtual machine from the second backup copy to the second data store.

In accordance with further aspects of this particular embodiment, wherein the first data store is optimized for fast random access to backup data.

In accordance with further aspects of this particular embodiment, wherein the second data store is optimized for fast read and write access to production data.

In accordance with further aspects of this particular embodiment, wherein the second backup copy is optimized for fast serial access to backup data.

In accordance with further aspects of this particular embodiment, wherein enabling use of the virtual machine further comprises configuring the virtual machine from a configuration stored in the first backup copy, modifying the configuration to refer to the second data store as a working directory and refer to the first data store for read access, and modifying the copy of the configuration to refer to the second data store for write access.

In accordance with further aspects of this particular embodiment, wherein enabling use of the virtual machine further comprises creating a snapshot of the virtual machine.

In accordance with further aspects of this particular embodiment, wherein migrating the virtual machine from the second backup copy to the second data store further comprises incorporating writes written to the second data store while the virtual machine is in use.

In accordance with additional aspects of this particular embodiment, the method may comprise sending a notification when the virtual machine recovery is complete.

In another particular exemplary embodiment, the techniques may be realized as a system for recovering a virtual machine comprising one or more processors communicatively coupled to a network, wherein the one or more processors are configured to select a first backup copy of a virtual machine in a first data store select a second data store, enable use of the virtual machine by reading from the first data store and writing to the second data store, select a second backup copy of the virtual machine, and migrate the virtual machine from the second backup copy to the second data store.

In accordance with additional aspects of this particular embodiment, wherein the first data store is optimized for fast random access to backup data.

In accordance with additional aspects of this particular embodiment, wherein the second backup copy is optimized for fast serial access to backup data.

In accordance with additional aspects of this particular embodiment, the one or more processors may be further configured to configure the virtual machine from a configuration of the virtual machine from the first data store to the second data store, modify the copy of the configuration to refer to the second data store as a working directory and refer to the first data store for read access, and modify the copy of the configuration to refer to the second data store for write access.

In accordance with additional aspects of this particular embodiment, wherein migrate the virtual machine from the second backup copy to the second data store further comprises incorporating writes written to the second data store while the virtual machine is in use.

In accordance with additional aspects of this particular embodiment, the one or more processors may be further configured to send a notification when the virtual machine recovery is complete.

In yet another particular exemplary embodiment, the techniques may be realized as an article of manufacture for recovering a virtual machine, the article of manufacture comprising at least one non-transitory processor readable storage medium, and instructions stored on the at least one medium, wherein the instructions are configured to be readable from the at least one medium by at least one processor and thereby cause the at least one processor to operate so as to In accordance with additional aspects of this particular embodiment, the instructions may cause the at least one processor to operate further so as to select a first backup copy of a virtual machine in a first data store. select a second data store, enable use of the virtual machine by reading from the first data store and writing to the second data store, select a second backup copy of the virtual machine, and migrate the virtual machine from the second backup copy to the second data store.

In accordance with additional aspects of this particular embodiment, wherein the first data store is optimized for fast random access to backup data.

In accordance with additional aspects of this particular embodiment, wherein the second backup copy is optimized for fast serial access to backup data.

In accordance with additional aspects of this particular embodiment, wherein the instructions cause the at least one processor to operate further so as to configure the virtual machine from a configuration of the virtual machine from the first data store to the second data store, modify the copy of the configuration to refer to the second data store as a working directory and refer to the first data store for read access, and modify the copy of the configuration to refer to the second data store for write access.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
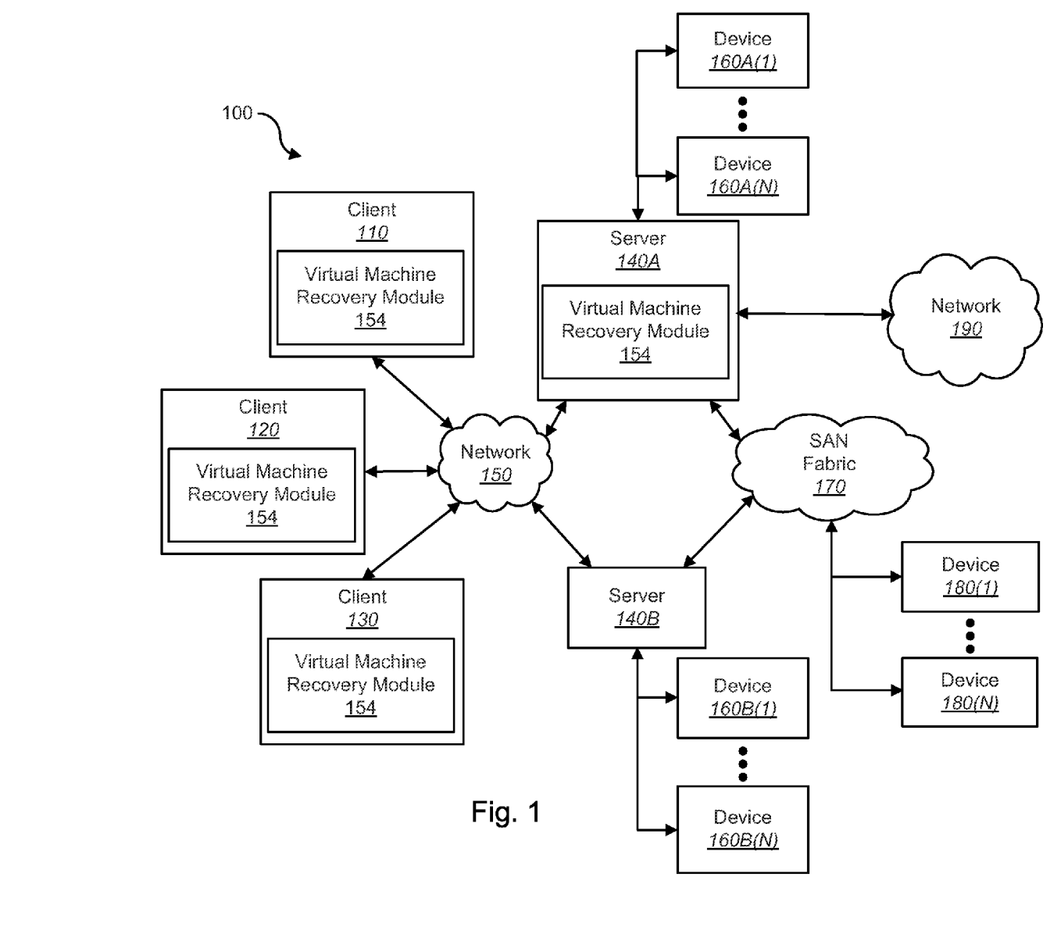
FIG. 1 shows a block diagram depicting a network architecture for virtual machine recovery in accordance with an embodiment of the present disclosure.

FIG. 1 shows a block diagram depicting a network architecture 100 for virtual machine recovery in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., virtual machine recovery module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
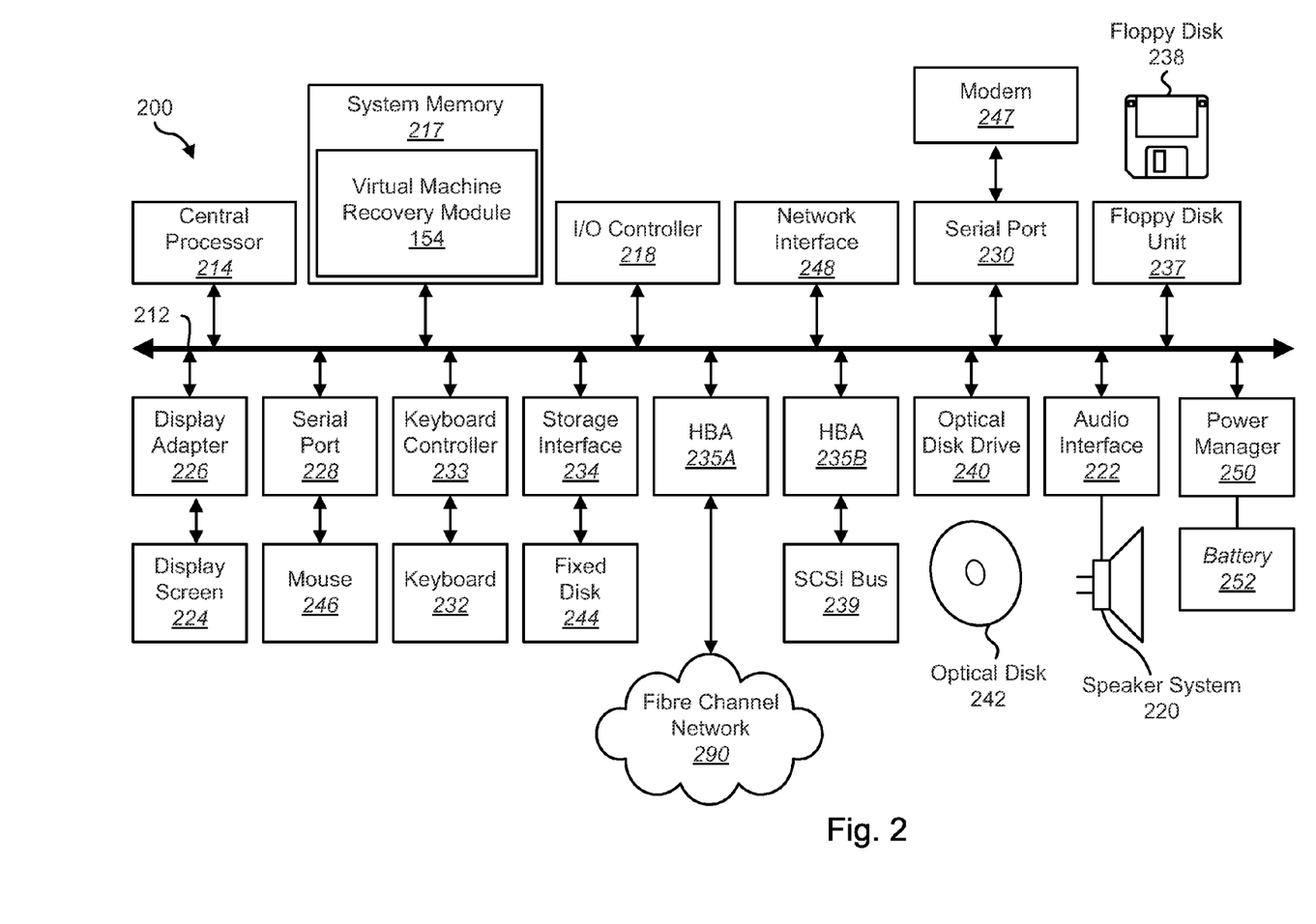
FIG. 2 depicts a block diagram of a computer system for virtual machine recovery in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for virtual machine recovery such as, for example, virtual machine recovery module 154. As illustrated, one or more portions of virtual machine recovery module 154 may reside at a network centric location. For example, server 140A may be a server, a firewall, a gateway, or other network element that may perform one or more actions to scan web applications for vulnerabilities. According to some embodiments, network 190 may be an external network (e.g., the Internet) and server 140A may be a gateway or firewall between one or more internal components and clients and the external network. According to some embodiments, virtual machine recovery module 154 may be implemented as part of a cloud computing environment.

FIG. 2 depicts a block diagram of a computer system 200 for virtual machine recovery in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, virtual machine recovery module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
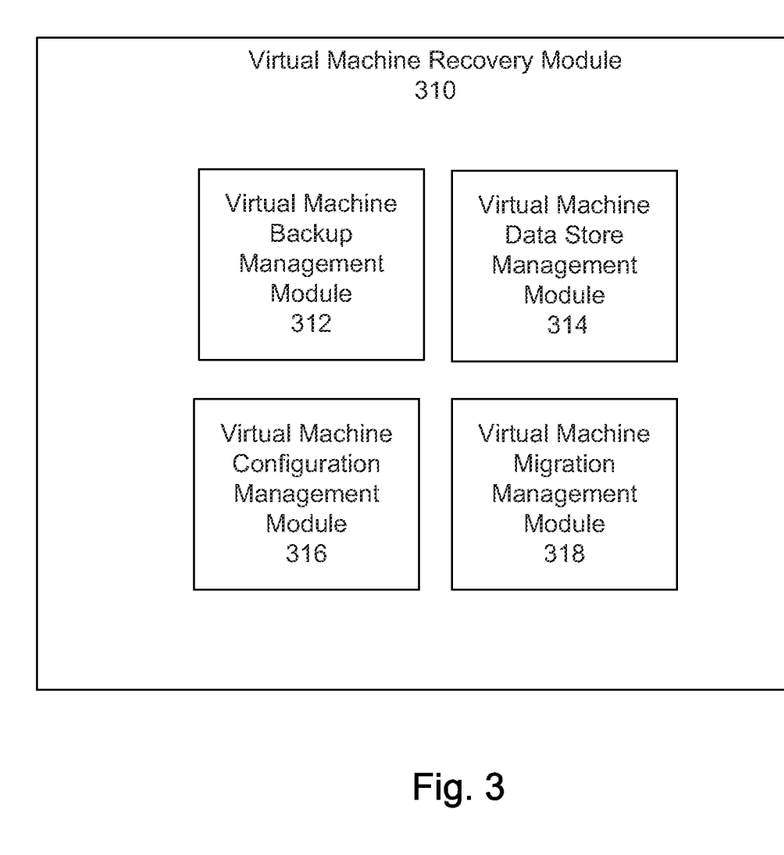
FIG. 3 shows a virtual machine recovery module in accordance with an embodiment of the present disclosure.

Referring to FIG. 3, there is shown a virtual machine recovery module 310 in accordance with an embodiment of the present disclosure. As illustrated, the virtual machine recovery module 310 may contain one or more components including virtual machine backup management module 312, virtual machine data store management module 314, virtual machine configuration management module 316, and virtual machine migration management module 318.

The description below describes network elements, computers, and/or components of a system and method for virtual machine recovery that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

According to some embodiments, virtual machine backup management module 312 may manage backup copies of virtual machines. The backup module 312 may maintain multiple copies of a virtual machine. The copies may be written to one or more storage systems and configured for read-only access in the event that recovery from a backup copy is desired. In some embodiments, one or more copies of a virtual machine may be stored in a data store optimized for fast random access. In some embodiments, one or more copies of a virtual machine may be stored in a data store optimized for fast serial access.

When recovery is desired, the backup module 312 may select a first backup copy for use by a virtual machine execution process. The execution process may read the virtual machine data from the first backup copy and enables use of the virtual machine by an end user. In some embodiments, the backup module 312 may select the first backup copy from a first data store optimized for fast random access to improve the performance of the execution process.

When recovery is desired, the backup module 312 may select a second backup copy for use by a virtual machine restoration process. The restoration process may read the virtual machine data from the second backup copy and enables restoration of the virtual machine to a production data store. The restoration process may include copying or migrating virtual machine data from one data store to another. In some embodiments, the backup module 312 may select the second backup copy from a second data store optimized for fast serial access to improve the performance of the restoration process.

According to some embodiments, the backup module 312 may be in communication with the virtual machine data store management module 314 to facilitate selecting data stores where the first and second backup copies are stored.

The data store module 314 manages the data stores in which virtual machine data is stored. The data store module 314 may manage data stores wherever they exist. In some embodiments, they may exist on remote servers, while in other embodiments they may be collocated with the data store module 314. A data store may be part of a cloud computing environment or a virtualized storage environment. Data stores may be configurable to be read only or for both read and write access. A backup data store may be dedicated for storing one or more backup copies of virtual machines, and a production data store may be dedicated to storing one or more production copies of virtual machines. A backup store may be optimized for either fast random access or fast serial access.

When recovery is desired, the data store module 314 may select a second data store to which the virtual machine may be recovered. The second data store may be used to store the production writes in a redo log during recovery. The second data store may also be used to store the virtual machine data as it is recovered from the backup copy to the new production copy.

According to some embodiments, the data store module 314 and the backup module 312 may be in communication with the virtual machine configuration management module 316 to facilitate modifying virtual machine configurations to refer to the backup copies and data stores where the backup copies are stored. A virtual machine configuration, such as a VMX file for a VMware ESX virtual machine, may include a reference to a particular copy of a virtual machine or a particular data store where the copy of the virtual machine is stored. In some embodiments, the configuration module 316 may modify one or more configurations of one or more virtual machines.

When recovery is desired, the configuration module 316 may copy files associated with the configuration of the first backup copy to the second data store that may receive production writes and the recovered virtual machine data. The configuration module 316 may modify a copy of the configuration to designate the first backup for production reads and the second data store for production writes during recovery. In some embodiments, after the virtual machine data has been restored to the second data store, the configuration module 316 may modify one or more copies of the configuration to designate the second data store for both production reads and production writes. The configuration module 316 may remove or disable any references to the first backup copy that is no longer being used for production reads.

According to some embodiments, the configuration module 316 may be in communication with the virtual machine migration management module 318 for facilitating migration of data for one or more virtual machines. Migration of a virtual machine may include moving or copying virtual machine data from one data store to another. In some embodiments, most or all of the migration can occur while one or more processes are using the virtual machine data. For example, a virtual machine may be instantly recovered for use during the recovery process. In some embodiments, the migration module 318 may, as desired, boot a virtual machine, suspend a booted virtual machine, resume a suspended virtual machine, stop or shut down a virtual machine, move, copy, send notification about the state of a virtual machine, or otherwise migrate a virtual machine, and incorporate changes to a virtual machine that occurred during migration.

When recovery is desired, the migration module 318 may communicate with the backup module 312 to facilitate selection of the first backup copy to use for the execution process. The migration module 318 may further communicate with the data store module 314 and the configuration module 316 to facilitate selection of the second data store to receive production writes in a redo log for the execution process and configure as a working directory for a virtual machine. After the configuration module 316 may copy and modify a configuration for the virtual machine according to the first backup copy and the second data store, the migration module 318 may create a snapshot of the virtual machine and boot the the virtual machine. The migration module 318 may optionally notify another module, user, or system administrator that the virtual machine has been recovered and is ready for use.

In some embodiments, the migration module 318 may further communicate with the data store module 314 to facilitate selection a second backup copy to migrate. In some embodiments, the second backup copy may be stored in a data store optimized for fast serial access. The migration module 318 may initiate a migration of the virtual machine data in the second backup copy to the second data store selected to receive the recovered virtual machine data. For example, in some embodiments, migration may be performed as a background restore process that may be part of Symantec NetBackup. In other embodiments, migration may be performed by VMware Storage vMotion. When migration is complete, the migration module 318 may temporarily suspend or stop the virtual machine to facilitate the configuration module 316 may modify the configuration to refer to the completely migrated virtual machine data. After the configuration has been modified, the migration module 318 may resume or restart the virtual machine.

Figure 4:
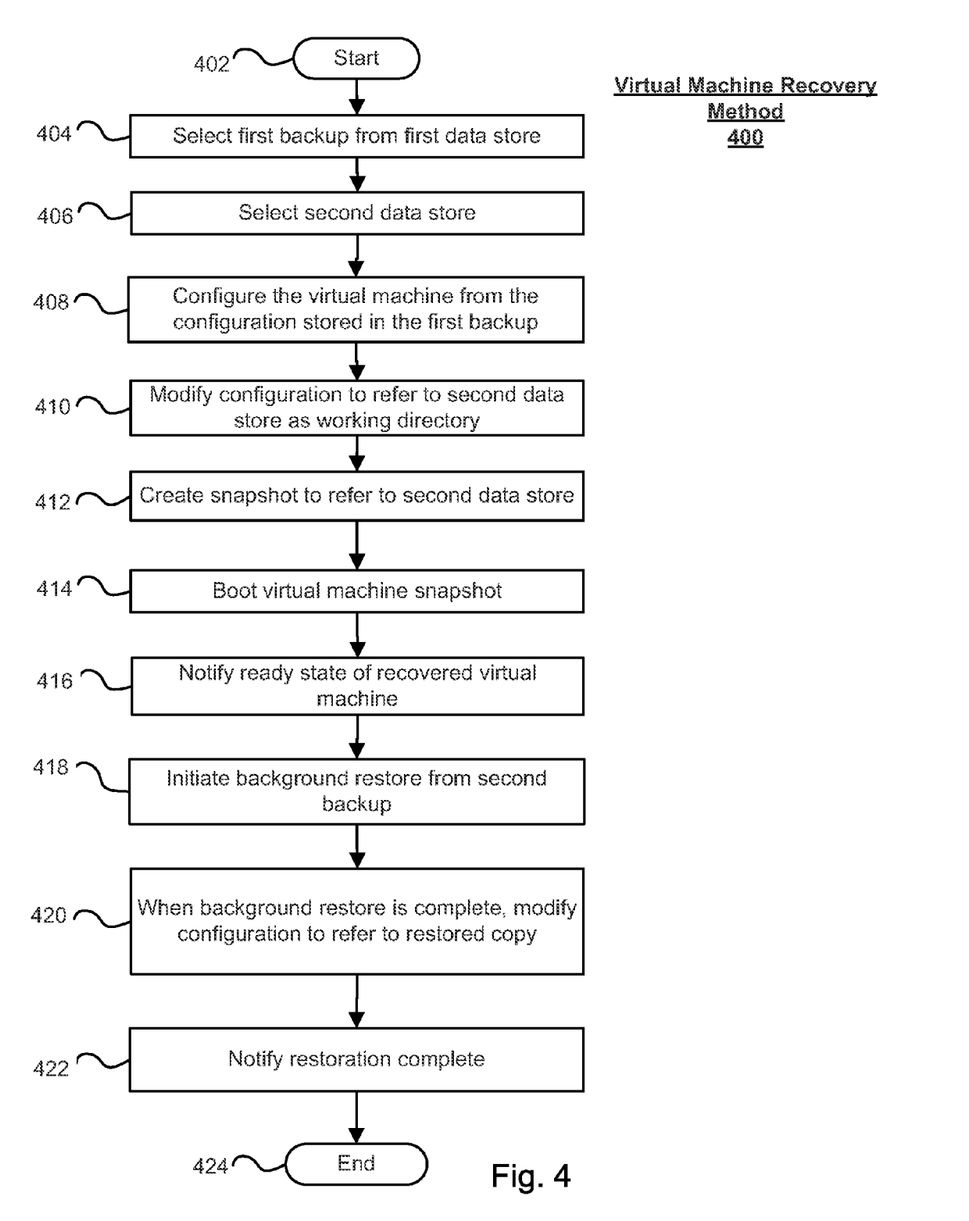
FIG. 4 depicts a method for recovering a virtual machine in accordance with an embodiment of the present disclosure.

Referring to FIG. 4, there is depicted a method 400 for recovering a virtual machine in accordance with an embodiment of the present disclosure. At block 402, the method 400 may begin.

At block 404, a first backup copy of a virtual machine may be selected from a first data store. In some embodiments, the first data store may be optimized for fast random access for use by an execution process.

At block 406, a second data store that is different from the first data store may be selected. In some embodiments, the second data store may be optimized for fast serial access for use by a restoration or migration process. The first and second data stores may be on remotely networked systems, cloud storage, or virtual storage systems. In other embodiments, the data stores may be co-located.

At block 408, a virtual machine may be configured at the second data store selected at block 406 based on the configuration stored in the first backup selected at block 404.

At block 410, the configuration may be modified to refer to the second data store selected at block 406 to be used as a working directory. The configuration information may be modified further to refer to the first backup copy for production reads within the execution process.

At block 412, a snapshot of the virtual machine may be created to refer to the second data store to store production writes within the execution process. In some embodiments, production writes may be stored in a redo log.

At block 414, the virtual machine may be booted.

At block 416, a notification may be sent that the snapshot of the virtual machine has been booted and is ready for production use in an execution process. Following block 414 and optional block 416, the virtual machine has been recovered with full read and write functionality. In some embodiments, performance may be improved during production reads if the first data store has been optimized for random access. At this point, the recovered virtual machine reads data from the first backup copy in the first data store and writes data to the redo log in the second data store.

At block 418, a background restore of the virtual machine data may be initiated from a second backup copy different from the first backup copy. In some embodiments, the second backup copy may be optimized for fast serial access to improve performance of a restoration or migration process. In some embodiments, the background restore may be initiated from a plurality of backup copies different from the first backup copy in parallel to improve performance further. In some embodiments, the background restore may use a SAN transfer medium to improve performance further still.

At block 420, after the background restore of the second backup copy to the production copy in the second data store is complete, the configuration of the virtual machine may be modified to refer to the restored copy for production reads and writes in an execution process. In some embodiments, the snapshot of the virtual machine may be temporarily suspended or shut down to facilitate modifying the configuration, then the virtual machine may be resumed or restarted after the configuration has been modified.

At block 422, a notification may be sent that the recovery and restoration process is complete.

At block 424, the method 400 may end.

At this point it should be noted that virtual machine recovery in accordance with the present disclosure as described above may involve the processing of input data and the generation of output data to some extent. This input data processing and output data generation may be implemented in hardware or software. For example, specific electronic components may be employed in a virtual machine recovery module or similar or related circuitry for implementing the functions associated with virtual machine recovery in accordance with the present disclosure as described above. Alternatively, one or more processors operating in accordance with instructions may implement the functions associated with virtual machine recovery in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for recovering a virtual machine comprising the steps of:
   selecting a first backup copy of a virtual machine in a first backup data store configured for read-only random access;
   selecting a production data store configured for read-write random access;
   enabling use of the virtual machine by reading from the first backup copy in the first backup data store and writing changes for the virtual machine to a redo log in the production data store;
   selecting a second backup copy of the virtual machine in a second backup data store configured for read-only sequential access;
   copying the virtual machine from the second backup copy to a production copy in the production data store;
   incorporating the changes for the virtual machine from the redo log to the production copy of the virtual machine in the production data store; and
   modifying a configuration of the virtual machine to refer to the production copy for reads and writes, wherein the virtual machine is temporarily suspended to facilitate modifying the virtual machine configuration, wherein the configuration of the virtual machine comprises a configuration file that includes one or more references to the first backup copy of the virtual machine in the first backup data store, wherein the modification of the configuration of the virtual machine comprises modifying the configuration file such that the one or more references are at least one of removed from the configuration file or disabled.

2. The method of claim 1, wherein the first backup data store is optimized for random access to backup data to be faster than sequential access to the backup data.

3. The method of claim 1, wherein the production data store is optimized for fast read and write access to production data.

4. The method of claim 1, wherein the second backup copy is optimized for sequential access to backup data to be faster than random access to the backup data.

5. The method of claim 1, wherein enabling use of the virtual machine further comprises:
configuring the virtual machine from a configuration stored in the first backup copy;
modifying the configuration to refer to the production data store as a working directory and refer to the first data store for read access; and
modifying the copy of the configuration to refer to the production data store for write access.

6. The method of claim 5, wherein enabling use of the virtual machine further comprises creating a snapshot of the virtual machine.

7. The method of claim 1, wherein copying the virtual machine from the second backup copy to the production data store further comprises incorporating writes written to the redo log in the production data store while the virtual machine is in use.

8. The method of claim 1 further comprising sending a notification when copying the virtual machine is complete or when incorporating the changes for the virtual machine is complete.

9. A system for recovering a virtual machine comprising:
one or more processors communicatively coupled to a network; wherein the one or more processors are configured to:
select a first backup copy of a virtual machine in a first backup data store configured for read-only random access;
select a production data store configured for read-write random access;
enable use of the virtual machine by reading from the first backup copy in the first backup data store and writing changes for the virtual machine to a redo log in the production data store;
select a second backup copy of the virtual machine in a second backup data store configured for read-only sequential access;
copy the virtual machine from the second backup copy to a production copy in the production data store;
incorporate the changes for the virtual machine from the redo log to the production copy of the virtual machine in the production data store; and
modifying a configuration of the virtual machine to refer to the production copy for reads and writes, wherein the virtual machine is temporarily suspended to facilitate modifying the virtual machine configuration, wherein the configuration of the virtual machine comprises a configuration file that includes one or more references to the first backup copy of the virtual machine in the first backup data store, wherein the modification of the configuration of the virtual machine comprises modifying the configuration file such that the one or more references are at least one of removed from the configuration file or disabled.

10. The system of claim 9, wherein the first backup data store is optimized for random access to backup data to be faster than sequential access to the backup data.

11. The system of claim 9, wherein the second backup copy is optimized for sequential access to backup data to be faster than random access to the backup data.

12. The system of claim 9, wherein the one or more processors are further configured to:
configure the virtual machine from a configuration of the virtual machine from the first backup data store to the second data store;
modify the copy of the configuration to refer to the production data store as a working directory and refer to the first backup data store for read access; and
modify the copy of the configuration to refer to the production data store for write access.

13. The system of claim 12, wherein the one or more processors, configured to copy the virtual machine from the second backup copy to the second data store, are further configured to incorporate writes written to the production data store while the virtual machine is in use.

14. The system of claim 9, wherein the one or more processors are further configured to send a notification when copying the virtual machine is complete or when incorporating the changes for the virtual machine is complete.

15. An article of manufacture for recovering a virtual machine, the article of manufacture comprising:
at least one non-transitory processor readable storage medium; and
instructions stored on the at least one medium;
wherein the instructions are configured to be readable from the at least one medium by at least one processor and thereby cause the at least one processor to operate so as to:
select a first backup copy of a virtual machine in a first backup data store configured for read-only random access;
select a production data store configured for read-write random access;
enable use of the virtual machine by reading from the first backup copy in the first backup data store and writing changes for the virtual machine to a redo log in the production data store;
select a second backup copy of the virtual machine in a second backup data store configured for read-only sequential access;
copy the virtual machine from the second backup copy to a production copy in the production data store;
incorporate the changes for the virtual machine from the redo log to the production copy of the virtual machine in the production data store; and
modifying a configuration of the virtual machine to refer to the production copy for reads and writes, wherein the virtual machine is temporarily suspended to facilitate modifying the virtual machine configuration, wherein the configuration of the virtual machine comprises a configuration file that includes one or more references to the first backup copy of the virtual machine in the first backup data store, wherein the modification of the configuration of the virtual machine comprises modifying the configuration file such that the one or more references are at least one of removed from the configuration file or disabled.

16. The article of manufacture of claim 15, wherein the first backup data store is optimized for random access to backup data to be faster than sequential access to the backup data.

17. The article of manufacture of claim 15, wherein the second backup copy is optimized for sequential access to backup data to be faster than random access to the backup data.

18. The article of manufacture of claim 15, wherein the instructions cause the at least one processor to operate further so as to:

configure the virtual machine from a configuration of the virtual machine from the first backup data store to the second data store;

modify the copy of the configuration to refer to the production data store as a working directory and refer to the first backup data store for read access; and modify the copy of the configuration to refer to the production data store for write access.

19. The article of manufacture of claim 15, wherein the at least one processors, caused to operate so as to copy the virtual machine from the second backup copy to a production copy in the production data store, is caused to operate further so as to incorporate writes written to the second data store while the virtual machine is in use.

20. The article of manufacture of claim 15, wherein the instructions cause the at least one processor to operate further so as to send a notification when copying the virtual machine is complete or when incorporating the changes for the virtual machine is complete.

* * * * *